E. L. POURTAUBORDE.
CUTTING OUT AND MOLDING MACHINE.
APPLICATION FILED FEB. 23, 1907.

1,017,461.

Patented Feb. 13, 1912.

4 SHEETS—SHEET 1.

WITNESSES
J. P. Davis
C. E. Holske

INVENTOR
Ernest Louis Pourtauborde
BY
ATTORNEYS

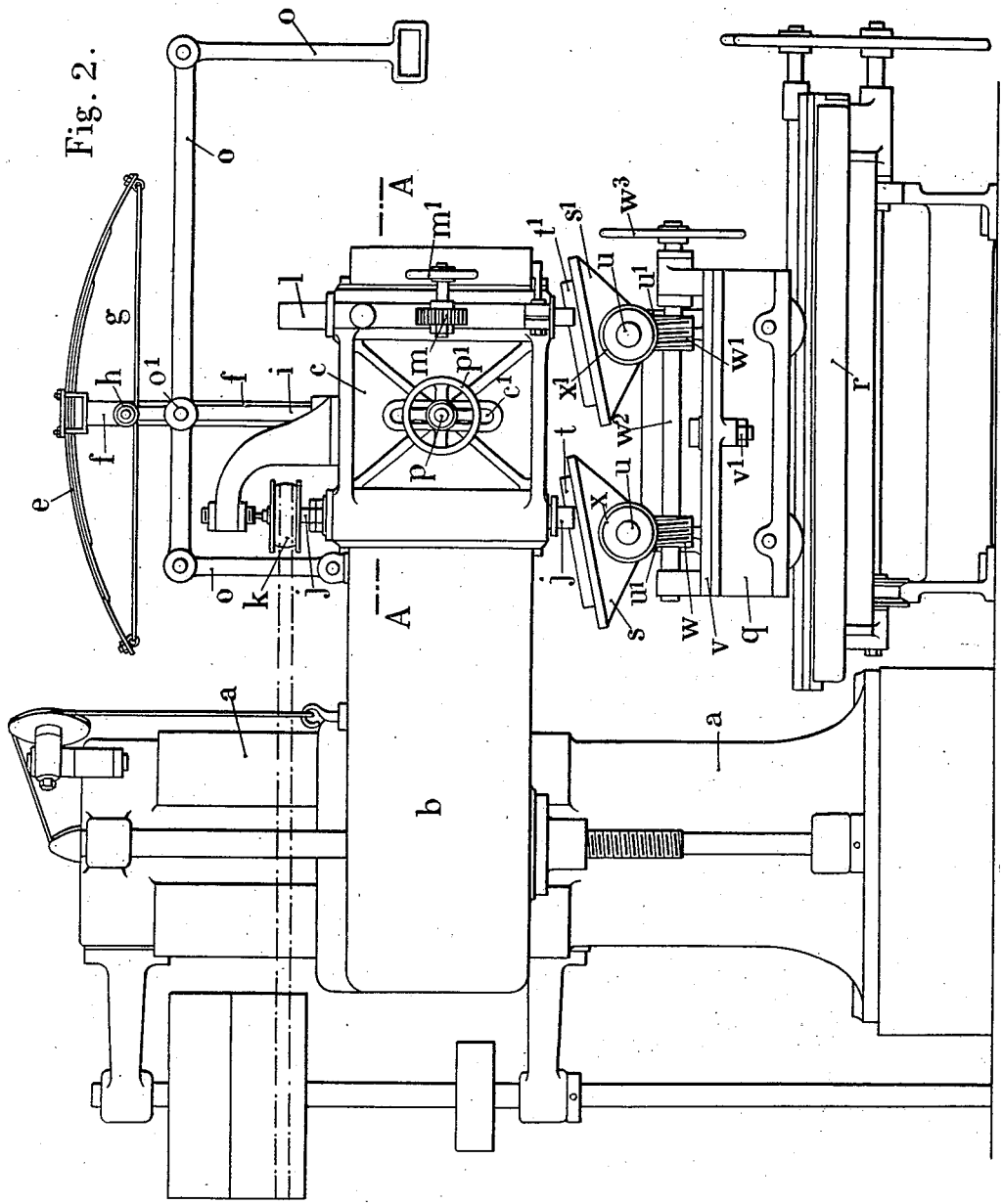

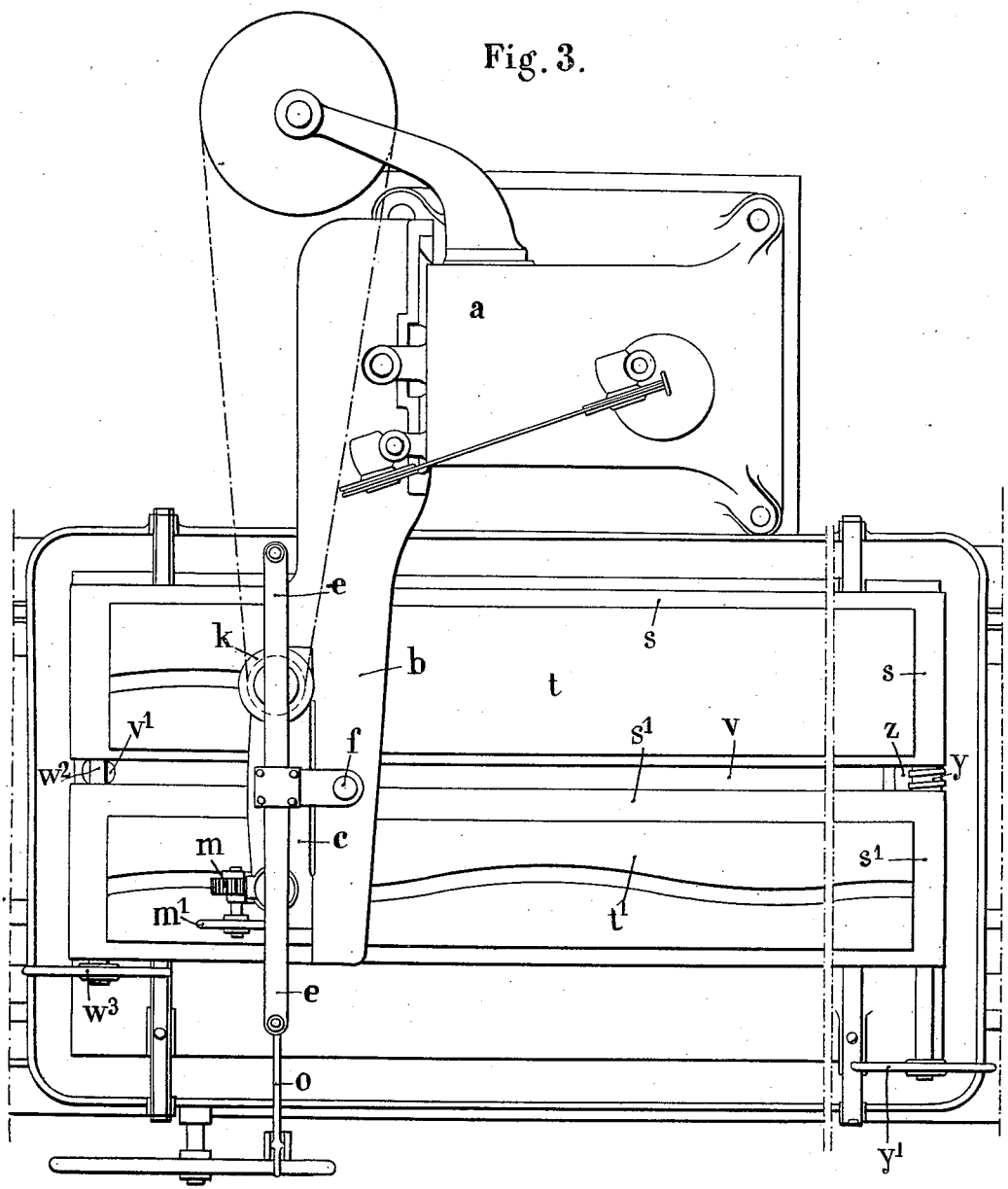

E. L. POURTAUBORDE.
CUTTING OUT AND MOLDING MACHINE.
APPLICATION FILED FEB. 23, 1907.

1,017,461.

Patented Feb. 13, 1912.
4 SHEETS—SHEET 4.

WITNESSES

INVENTOR
Ernest Louis Pourtauborde
BY
ATTORNEYS

UNITED STATES PATENT OFFICE.

ERNEST LOUIS POURTAUBORDE, OF PARIS, FRANCE, ASSIGNOR TO SOCIÉTÉ DES ONYX DU SIDI-HAMZA ET DES PYRÉNÉES, OF PARIS, FRANCE.

CUTTING-OUT AND MOLDING MACHINE.

1,017,461.      Specification of Letters Patent.      Patented Feb. 13, 1912.

Application filed February 23, 1907. Serial No. 359,010.

*To all whom it may concern:*

Be it known that I, ERNEST LOUIS POURTAUBORDE, of 13 Rue du Faubourg Montmartre, in the city of Paris, Republic of France, engineer, have invented a Cutting-Out and Molding Machine, of which the following is a full, clear, and exact description.

The present invention relates to a machine for molding and cutting out, according to certain patterns or models, objects of any desired shape, such as countersinks, granite walls, or stones by means of rotating steel tools.

The machine can be used for working materials of all kinds but is especially adapted to hard substances such as marble, onyx, granite and the like.

The machine is essentially characterized by the following features:

First, the arrangement and method of mounting the supports on which are fixed the model and the work, so that the supports can be inclined simultaneously, and in parallel during the operation to form angles which can be varied at will both in a vertical and in a horizontal plane, the movement of the supports being manually controlled.

Second; the method of mounting the tool whereby it may be brought into contact with the work by the pressure of the hand upon a conveniently arranged lever. By reason of this arrangement of the supports and of the tool, the operator is able to diminish or prolong the time of contact of the tool and to vary the pressure of the tool at different points of the piece to be produced, from which results the following: First, an increased production; second, making it possible to cut out or mold in different planes very delicate parts which could not be made by hand.

Figure 1:
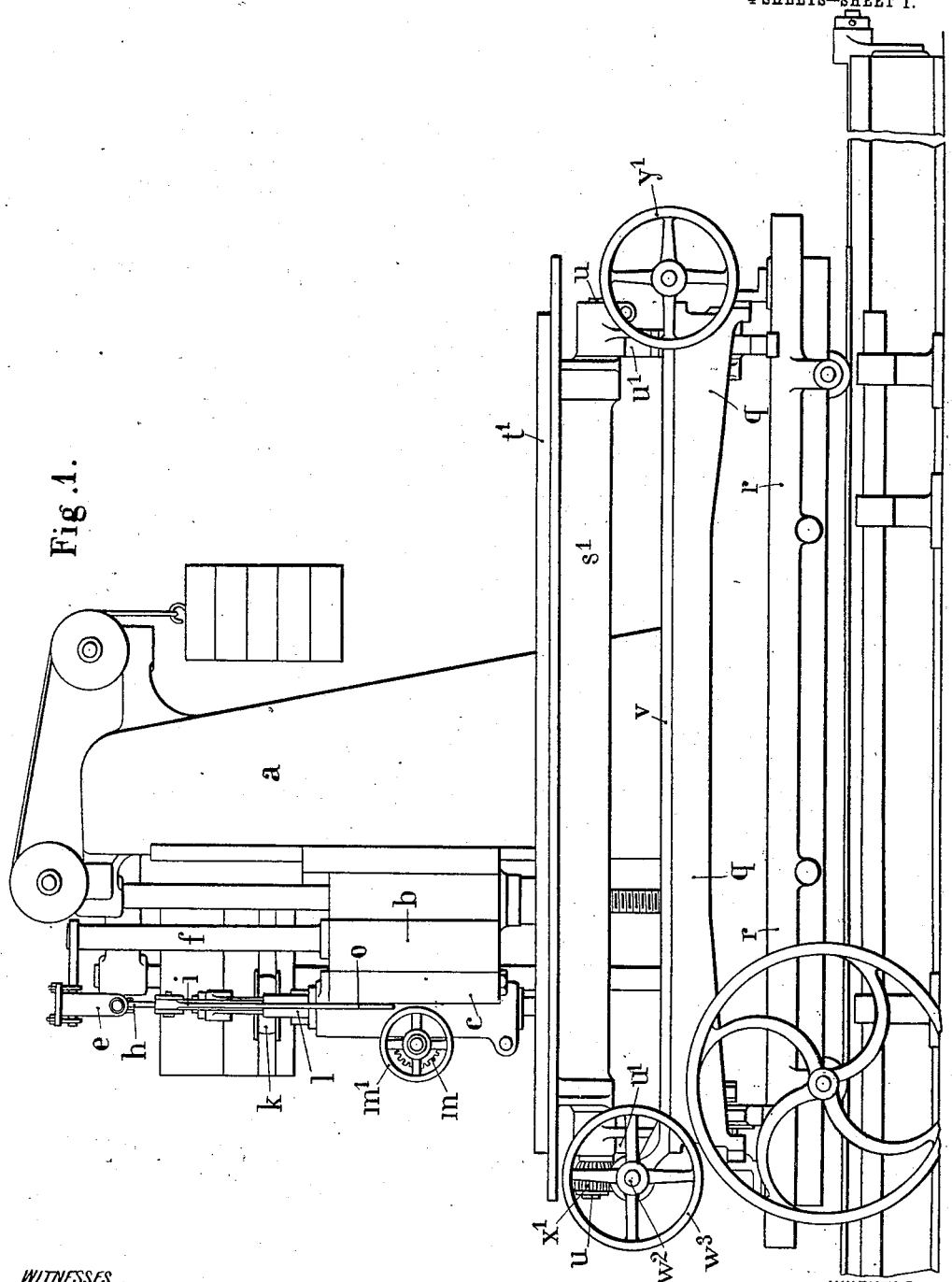
Figure 5:
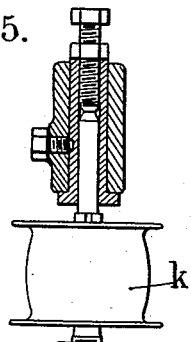
Figure 6:
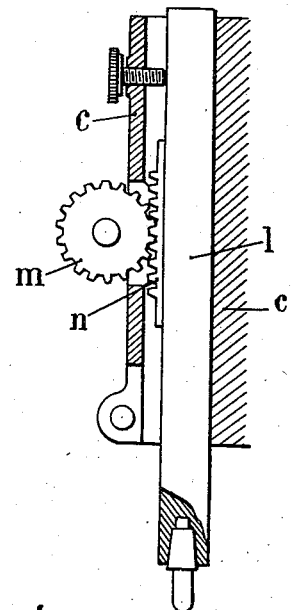
Figure 4:
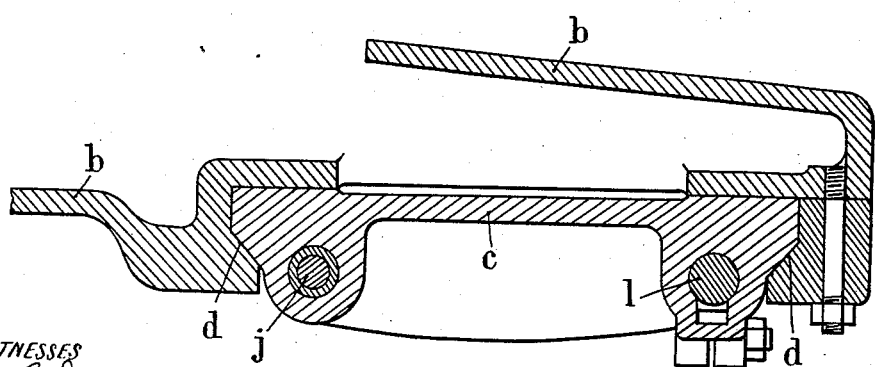

The invention is shown in the accompanying drawings in which,

Figure 1 is a face view of the machine. Fig. 2 is a side view. Fig. 3 is a plan view corresponding to Fig. 1. Fig. 4 is a horizontal section on the line A—A of Fig. 2, and Figs. 5 and 6 are detail views.

As shown in the drawings, the present machine is provided with a vertical frame $a$, on which can vertically slide a carriage $b$. This carriage is mounted in the same manner as the carriages of the machine for the countersinking of metal, or of machines for molding marble, that is to say, the carriage can be moved easily by hand under the action of the counterweight, and it is stopped afterward at the desired height by a nut on which it can lie. This nut can be moved on a vertical shaft, which is screw threaded for that purpose.

A second carriage $c$ is mounted for vertical movement in the wedge shaped guides $d$, carried by the carriage $b$ (Fig. 4) and the said carriage $c$ is retained in its uppermost position by means of a laminated spring $e$ fixed at its center on a vertical support $f$, forming a part of the carriage $b$, (Fig. 3).

The two ends of the spring are united by a cord or flexible wire $g$ on which is placed a pulley $h$ mounted on the end of a vertical rod $i$ forming a part of the carriage $c$. The carriage $c$ carries the tool operating on the material as well as the blunt point which serves as a guide.

A metallic arbor $j$ passes through the entire height of the carriage $c$, the lower end of the arbor receiving the proper tool (Fig. 5) and the said arbor may receive a rotary movement of variable speed by means of a belt passing over the pulley $k$ fixed to the upper end of the said arbor, or in any other suitable manner. The blunt guide is also carried by a vertical arbor $l$ passing through the carriage $c$, and the arbor $l$ can be moved vertically by means of a toothed wheel $m$, operated by a hand wheel $m'$, and engaging on a rack $n$ fixed on the arbor $l$. The latter can be afterward maintained at the desired height by any retaining device, for example by means of a screw the end of which would press on the shaft 1. The contact of the tool and of the blunt point with a piece of work and the model is obtained by exerting pressure on the end of an articulated lever $o$, connected with the supporting rod $i$ of the carriage $c$ by means of a shaft $o'$, which causes the spring to stretch, and the wire $g$ to bend. When this pressure on the lever $o$ is removed, the spring relaxes, drawing with it the carriage $c$ which rises again. The contact of the tool and the guide ceases when the pressure is relaxed.

To operate in one plane, the carriage $c$ can be secured on the carriage $b$ by means of a pressure screw $p$ operated by a hand wheel $p'$ and engaged in an opening $c'$, in the carriage c. Below the carriages b and c are placed two other carriages q and r, the said carriages being superposed as shown in Figs. 1 and 2 of the drawing, and can be moved at right angles to one another, the carriage r by running on rails placed on the ground, and the carriage q by running on rails carried by the carriage r.

On the upper carriage q are placed two horizontal supports s, s', on which are fixed in any suitable manner, the work t, and the model t'. The supports s, s' are mounted on trunnions u, suitably supported by the lugs u' fastened to the ends of the bed plate v placed on the carriage q. The supports can be inclined simultaneously and in parallel, and at any angle, by means of two worms w, w', carried by a horizontal worm shaft $w^2$, and acting on two worm wheels x, and x', fixed on the supports s, s'. The shaft $w^2$, being operated by a hand wheel $w^3$. The plate or bed v, on which are mounted the supports s, s', is articulated at one end on a shaft v', and can be moved in a horizontal plane by turning on its axis under the action of an endless screw y controlled by a flywheel y' and engaging with a rack z, placed at the other end on the bed v. The arrangement of the carriages q, and r and of the bed v is therefore such that the work t and the model t' can be moved in any direction simultaneously and in unison, whereby to bring them in any desired position in contact with the tool and the blunt guide carried by the carriage c.

I claim:

1. A cutting out and molding machine comprising a frame, a carriage mounted for vertical movement on the frame, a second carriage mounted for vertical movement on the first carriage, a spring connecting the first carriage and the second carriage and supporting the said second carriage, an elbow lever mounted on the first carriage, having one arm connected with the second carriage, horizontal supports for the work and for the model, each of the said supports being provided with trunnions, a bed plate having bearings for receiving the trunnions, a carriage mounted for transverse movement upon which the bed plate is supported, and another carriage upon which the first carriage is transversely movable.

2. A cutting out and molding machine comprising a frame, a carriage mounted for vertical movement on the frame, said carriage having wedge-shaped grooves, a second carriage having ribs for engaging the grooves and movable vertically on the first carriage, a laminated spring connecting the carriages and supporting the second carriage, a cord or wire connecting the ends of the spring, a rod on the second carriage, a pulley connected with the rod and engaging the cord, vertical arbors in the second carriage, an elbow lever mounted on the first carriage, having one arm connected with the second carriage, horizontal supports for the work and for the model, a bed plate upon which the supports are mounted, a carriage upon which the bed plate is mounted, and another carriage mounted for longitudinal movement on the frame, the carriage carrying the bed plate being transversely movable on the last-named carriage.

3. A cutting out and molding machine comprising a frame, a carriage mounted for vertical movement on the frame, a second carriage mounted for vertical movement on the first carriage, a spring connecting the carriages and supporting the second carriage, said second carriage having vertical arbors, one of the arbors being adapted to carry a tool, a guiding point carried by the second arbor, said second arbor having a rack, a pinion engaging the rack, an elbow lever mounted on the first carriage, and having one arm connected with the second carriage, supports for the work and for the model, a bed plate upon which the supports are mounted, a carriage upon which the bed plate is mounted, and another carriage movable longitudinally on the frame, the carriage carrying the bed plate being mounted for transverse movement on the last-named carriage.

4. A cutting out and molding machine comprising a frame, a carriage mounted for vertical movement on the frame, a second carriage mounted for vertical movement on the first carriage, said second carriage having vertical arbors, an elbow lever mounted on the first carriage and having one arm connected with the second carriage, supports for the work and for the model, each support being provided with trunnions, a bed plate having bearings for the trunnions, pinions on the supports, parallel endless screws engaging the pinions for actuating the same to simultaneously move the said pinions, a carriage upon which the bed plate is mounted for transverse movement, and another carriage on the frame upon which the carriage carrying the bed plate is mounted for transverse movement.

5. A cutting out and molding machine comprising a frame, a carriage mounted for vertical movement on the frame, a second carriage mounted for vertical movement on the first carriage, a spring connecting the carriages and supporting the second carriage, said second carriage having vertical arbors, an elbow lever mounted on the first carriage and having one arm connected with the second carriage, horizontal supports for the work and for the model, each of the said supports being provided with trunnions, a bed plate having bearings for receiving the trunnions, a vertical shaft on which the bed plate is mounted, a rack secured to one end of the bed plate, a pinion engaging the rack for turning the bed plate on its axis, a carriage upon which the bed plate is mounted, and another carriage mounted on the frame for longitudinal movement and upon which the first carriage is mounted for transverse movement.

The foregoing specification of my cutting out and molding machine signed by me this 11th day of February 1907.

ERNEST LOUIS POURTAUBORDE.

Witnesses:
HANSON C. COXE,
MAURICE H. PIGNET.

Copies of this patent may be obtained for five cents each, by addressing the "Commissioner of Patents, Washington, D. C."